(12) United States Patent
Mueller

(10) Patent No.: US 8,651,248 B2
(45) Date of Patent: Feb. 18, 2014

(54) BRAKE DISK

(75) Inventor: Hans-Walter Mueller, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 13/119,384

(22) PCT Filed: Aug. 5, 2009

(86) PCT No.: PCT/EP2009/060128
§ 371 (c)(1),
(2), (4) Date: Jul. 19, 2011

(87) PCT Pub. No.: WO2010/031633
PCT Pub. Date: Mar. 25, 2010

(65) Prior Publication Data
US 2011/0259682 A1    Oct. 27, 2011

(30) Foreign Application Priority Data
Sep. 17, 2008   (DE) .......................... 10 2008 042 168

(51) Int. Cl.
*F16D 65/12*   (2006.01)
(52) U.S. Cl.
USPC ................................................... 188/218 XL
(58) Field of Classification Search
USPC ........... 188/17, 18 A, 218 A, 218 R, 218 XL, 188/264 AA
See application file for complete search history.

(56) References Cited

U.S. PATENT DOCUMENTS

| | | | |
|---|---|---|---|
| 3,587,269 A | 6/1971 | Seccombe et al. | |
| 4,280,598 A * | 7/1981 | Pollinger | 188/218 XL |
| 5,823,303 A * | 10/1998 | Schwarz et al. | 188/218 XL |
| 7,416,060 B2 * | 8/2008 | Takizawa | 188/218 XL |
| 7,467,694 B2 * | 12/2008 | Botsch | 188/218 XL |
| 7,967,115 B2 * | 6/2011 | Keller | 188/218 XL |
| 2003/0159893 A1 * | 8/2003 | Tironi | 188/71.1 |
| 2004/0149525 A1 | 8/2004 | Gotti et al. | |

FOREIGN PATENT DOCUMENTS

| | | |
|---|---|---|
| DE | 26 44 223 | 5/1978 |
| DE | 43 32 951 | 8/1994 |
| DE | 198 50 180 | 7/1999 |
| DE | 100 32 662 | 5/2002 |
| DE | 103 22 454 | 2/2004 |
| DE | 10 2004 048916 | 4/2006 |
| DE | 10 2007 054393 | 5/2009 |
| WO | 2003/002885 | 1/2003 |

OTHER PUBLICATIONS

International Search Report for PCT/EP2009/060128, dated Oct. 29, 2009.

* cited by examiner

*Primary Examiner* — Christopher Schwartz
(74) *Attorney, Agent, or Firm* — Kenyon & Kenyon LLP

(57) ABSTRACT

A brake disk is described that has a friction ring and a disk chamber connected to the friction ring via connecting links. Bores, into which the connecting links are inserted, are formed in the circumference of the friction ring. The connecting links are calibrated using a die before being inserted into the bore. A calibration ball is introduced into the bore with the aid of which the wall of the bore is calibrated when the connecting link is inserted.

16 Claims, 2 Drawing Sheets

(A-A)

BRAKE DISK

FIELD OF THE INVENTION

The present invention relates to a brake disk, in particular a ventilated brake disk, having a friction ring and a supporting structure, in particular a disk chamber, connected to the friction ring via connecting links.

BACKGROUND INFORMATION

A ventilated brake disk, which has a friction ring and a supporting structure connected to the friction ring by connecting links, is discussed in DE 43 32 951 A1. The connecting links are configured in particular as pins, bolts, or the like, and are positioned over the circumference of the supporting structure. The connecting links project into recesses in the circumferential wall of the friction ring. In the presence of high braking torques, there is the danger that the free length of the connecting links, i.e., the distance between the supporting structure and the friction ring, may, in the extreme case, cause the connecting links to bend and become detached from their seat. In the case of this and other brake disks in common use, the pins are introduced into the bore using a so-called sliding fit. The surface of the pins is polished and the bore wall is ground. According to the grinding or polishing process used, machining traces running in a radial direction are created, which means that they are formed at nearly a right angle to the pin's direction of movement in the bore. The machining traces on the surfaces may thus stick to one another and thus impede the movement of the pin in the bore. Since the pin is made of stainless steel and the brake disk is made of gray iron, these two components exhibit varying expansions at the temperatures arising during operation. In the extreme case, this may even cause the tolerance range provided for the sliding to be exceeded, and the pins may become stuck in the bore. This would mean that the sliding fit provided for and set to room temperature would develop into an interference fit during operation. This prevention of the pins from sliding in the bores may result in warps or cracks in the friction ring. Furthermore, when the brake disk is subsequently cooled, noises might be created by the radial machining traces which now separate again. Furthermore, a plurality of machining steps is necessary during manufacturing, so that the wall of the bore must be ground and the wall of the pin polished in each machining step, and the pin must subsequently be introduced into the bore as an additional manufacturing step. This makes the manufacturing of these brake disks complex and expensive.

SUMMARY OF THE INVENTION

In contrast, the brake disk according to the present invention having the characterizing features described herein has the advantage that the necessary machining processes are reduced. When the pin is inserted into the bore, a precision calibration ball is used to calibrate the walls of the bore simultaneously. This not only smooths the surface of the bore but also hardens the surface to a specific penetration depth. Prior to this, the pin may be calibrated using a die. When the surface of the bore or the surface of the pin is calibrated, no circular structures are produced, but instead axial structures, i.e., structures running in the direction of movement of the pin are produced at most. As a result, the structures of the pins and the bores are no longer able to influence one another at both room temperature and at operating temperature. This makes it easily possible to set the tolerance range necessary for error-free braking even at operating temperature due to the thermal stresses. This means that both the tolerance range and the manufacturing costs are reduced. If the faces of the pins are dome-shaped, the pin may be used to guide the calibration ball through the bore with pressure. The dome shape makes it possible to distribute the application pressure of the pin over a larger area of the calibration ball, thus preventing the end of the pin from being deformed by joining pressure or calibration pressure that may occur. If the length of the bore is appropriately configured, the calibration ball may also remain in the bore without influencing the function of the brake disk in the case of a blind bore.

DETAILED DESCRIPTION

Figure 1:
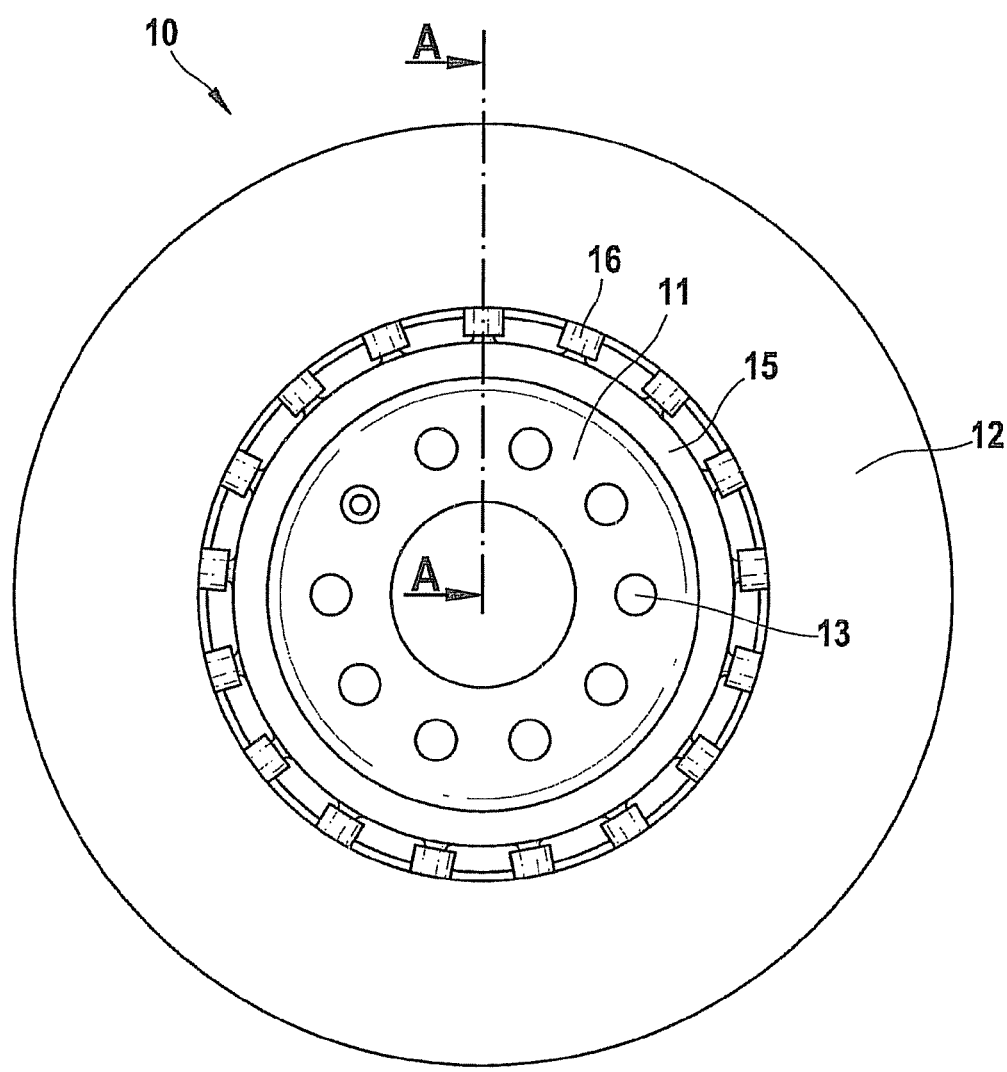
FIG. 1 shows a top view of a brake disk.

In FIG. 1, a brake disk is denoted as 10, the brake disk being made up of a disk chamber 11 and a friction ring 12. In a known manner, disk chamber 11 is attached to a hub of a vehicle in a manner not shown here, the screws for fastening protruding through bores 13 of disk chamber 11. Disk chamber 11 is connected to friction ring 12 via a large number of connecting links in the form of pins 16 or bolts, or the like, formed in circumferential wall 15 of disk chamber 11. Friction ring 12 is made up of two friction ring halves 12a and 12b which are connected to one another by a large number of webs 17 distributed over the circumference and running in particular in the radial direction, resulting in a ventilated brake disk. Supporting webs 18 are formed in sections in the area of the inner circumference of friction ring 12. These supporting webs 18 have a continuous bore 19 for accommodating pins 16. However, blind bores would also be conceivable. These bores 19 are shown in the drawings in the central longitudinal axis of friction ring 12. However, an offset of these bores 19 would also be possible.

Figure 2:
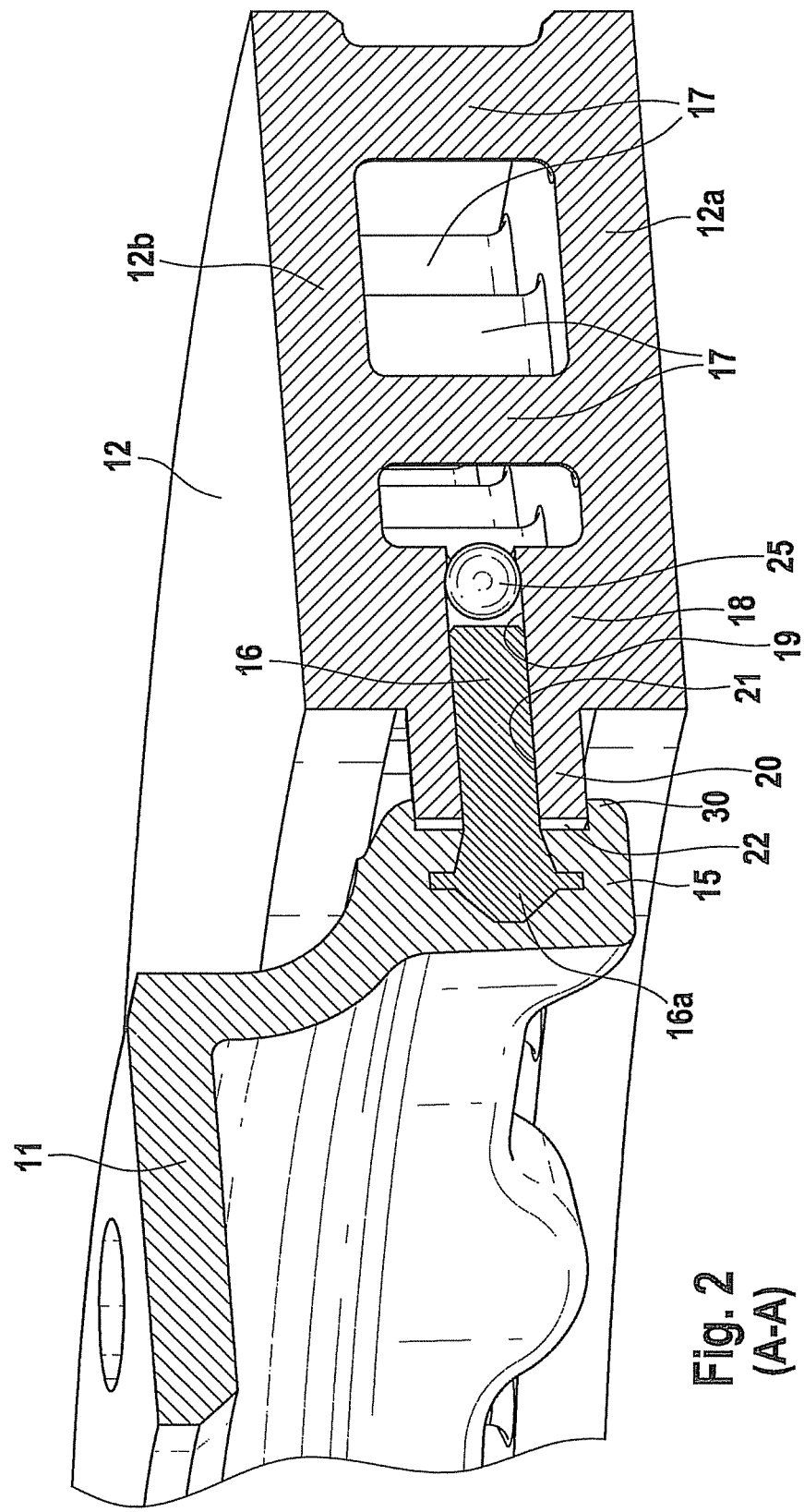
FIG. 2 shows a perspective representation, such as would result in a partial section A/A through the brake disk according to FIG. 1.

In the area of bores 19, supporting webs 18 have projections 20 formed in the direction of disk chamber 11. Projections 20 also have continuous bores 21 which are in alignment with bores 19. A small gap 22 is present between the face of projections 20 and the circumference of disk chamber 11. Friction ring 12 is made of cast iron while disk chamber 11 is made of a light metal, in particular aluminum or magnesium. Pin 16 is made of stainless steel, in particular non-rusting stainless steel. Pins 16 are calibrated using a die. Corresponding to the calibration, the surface of the pin is compressed to a slight depth of penetration and is thus also hardened. Due to the movement taking place during calibration, pin 16 has an elongated surface structure resulting from the calibration only in its longitudinal direction, i.e., in its later direction of movement in bore 19. When pin 16 is manufactured, spherical caps may be pressed onto its end. As shown in FIG. 2, calibration ball 25 has a slightly larger diameter than bore 21 and bore 19. This larger diameter causes the wall of bore 21 and 19 to be compressed. After respective calibration ball 25, pins 16 are inserted into bores 21 and 19 and are introduced into bores 21 and 19 at a corresponding pressure, so that the wall of bore 21 and 19 is calibrated as a result of calibration ball 25 being pushed ahead of pin 16.

If bore 19 is configured as a continuous bore and pin 16 is of appropriate length, calibration ball 25 may be pushed out of bore 19 again at the end of the bore and removed if necessary.

However, without influencing the function of the brake disk, it would also be conceivable for calibration ball 25 to remain in bore 19 in the case of a blind bore. The face of pin 16 may be configured in various ways. It is particularly advantageous if it is configured as a so-called "spherical cap" which corresponds to the shape of calibration ball 25. As a result, the application pressure of pin 16 onto calibration ball 25 is distributed over a greater area, thus preventing the end of pin 16 facing calibration ball 25 from being deformed. After the calibration process, pins 16 remain in bores 19, so that disk chamber 11 may subsequently be cast on. In this connection, heads 16a of pins 16 are also cast into outer wall 15 of disk chamber 11. Projections 20 may also be used for accommodating disk chamber 11 in the casting die. The casting is performed directly onto the faces of projections 20 of friction ring 12.

Aforementioned gap 22 is produced when disk chamber 11 is cooled. However, it should be configured to be as slight as possible. Friction ring 12 is configured to be floating on disk chamber 11. To that end, pins 16 must be situated in bores 19 with relatively slight play and configured as above to have as low tolerance as possible, so that friction ring 12 is able to move slightly on pins 16 both at room temperature and at operating temperature. This tolerance range is necessary since friction ring 12 is heated during the braking operation and expands away from disk chamber 11 in the radial direction.

In FIG. 2, an overhang 30 has been formed on outer wall 15 of disk chamber 11, the overhang encompassing projection 20 radially. Overhang 30 must be longer than gap 22; in particular, it must also entirely cover the enlargement of the gap caused by the thermal expansion of friction ring 12. This means that in any situation, overhang 30 should conceal gap 22 which may become enlarged; in particular it should entirely cover it. Since, however, absolute imperviousness is not possible due to the slight relative movement between overhang 30 and projection 20, a temperature-resistant lubricant is situated in gap 22. On the one hand, this ensures the sliding process of pin 16 in bore 19 and, on the other hand, prevents corrosion caused by a de-icing agent that may penetrate into gap 22. However, it would also be conceivable to design disk chamber 11 without overhang 30 without departing from the object of the exemplary embodiments and/or exemplary methods of the present invention.

What is claimed is:

1. A ventilated brake disk, comprising:
   a friction ring;
   a supporting structure; and
   for each of at least one bore in the friction ring:
      a respective connecting link extending, at a first edge of the connecting link, from inside a circumference of the supporting structure, projecting into the respective bore of the friction ring, and terminating at a terminal edge of the connecting link that is opposite the first edge; and
      a respective leading element situated in the bore entirely beyond the terminal edge of the respective connecting link.

2. The brake disk of claim 1, wherein the disk chamber is made of a light metal, the friction ring is made of cast iron and the connecting link is made of stainless steel.

3. The brake disk of claim 2, wherein the disk chamber is made of aluminum.

4. The brake disk of claim 1, wherein a surface of the connecting link is calibrated.

5. The brake disk of claim 1, wherein the connecting link is supported in the bore in a sliding manner.

6. The brake disk of claim 1, wherein the at least one bore is a blind bore.

7. The brake disk of claim 1, wherein the terminal edge of the connecting link and the leading element are configured to correspond to one another.

8. The brake disk of claim 1, wherein the terminal edge of the connecting link is dome-shaped.

9. The brake disk of claim 1, wherein the leading element is a ball.

10. The brake disk of claim 1, wherein the friction ring includes at least one projection cast onto an inner circumference of the friction ring and in which the at least one bore is formed.

11. The brake disk of claim 1, wherein the connecting link is one of a pin and a bolt.

12. A method of forming a ventilated brake disk, comprising:
   forming a friction ring including at least one bore at an inner circumference thereof;
   for each of the at least one bore, inserting a leading element into the bore followed by insertion into the bore of a respective connecting link;
   forming a supporting structure; and
   attaching the supporting structure to the friction ring via the at least one connecting link, the at least one connecting link thereby extending from inside an outer circumference of the supporting structure while projecting into the respective bore of the friction ring;
   wherein the insertion of the leading element into the bore compresses at least one wall of the bore.

13. The method of claim 12, wherein, prior to the insertion of the leading element, the width of the leading element is larger than a width of the bore.

14. The method of claim 13, wherein the leading element is a ball whose diameter is larger than the width of the bore.

15. A method of forming a ventilated brake disk, comprising:
   forming a friction ring including at least one bore at an inner circumference thereof;
   for each of the at least one bore, inserting a leading element into the bore followed by insertion into the bore of a respective connecting link;
   forming a supporting structure; and
   attaching the supporting structure to the friction ring via the at least one connecting link, the at least one connecting link thereby extending from inside an outer circumference of the supporting structure while projecting into the respective bore of the friction ring;
   wherein the leading element is removed from the friction ring after the insertion of the connecting link.

16. A method of forming a ventilated brake disk, comprising:
   forming a friction ring including at least one bore at an inner circumference thereof;
   for each of the at least one bore, inserting a leading element into the bore followed by insertion into the bore of a respective connecting link;
   forming a supporting structure; and
   attaching the supporting structure to the friction ring via the at least one connecting link, the at least one connecting link thereby extending from inside an outer circumference of the supporting structure while projecting into the respective bore of the friction ring;
   wherein the leading element is a ball.

* * * * *

UNITED STATES PATENT AND TRADEMARK OFFICE
CERTIFICATE OF CORRECTION

PATENT NO.        : 8,651,248 B2
APPLICATION NO.   : 13/119384
DATED             : February 18, 2014
INVENTOR(S)       : Hans-Walter Mueller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 152 days.

Signed and Sealed this

Twenty-ninth Day of September, 2015

Michelle K. Lee
*Director of the United States Patent and Trademark Office*